Jan. 13, 1953  S. A. WILSON  2,625,175
SIPHON BOX
Filed May 31, 1949

INVENTOR.
S.A. WILSON
BY
C. M. McKnight
ATTORNEY

Patented Jan. 13, 1953

2,625,175

UNITED STATES PATENT OFFICE 2,625,175

SIPHON BOX

Samuel A. Wilson, Tulsa, Okla., assignor to Maloney-Crawford Tank & Manufacturing Company, Tulsa, Okla., a corporation of Delaware Application May 31, 1949, Serial No. 96,217

3 Claims. (Cl. 137—577)

This invention relates to improvements in siphon boxes, such as those commonly used in conjunction with oil field oil-water separators, and more particularly, but not by way of limitation, to an externally adjustable overflow device for said siphon boxes.

Emulsion treaters or separators are commonly used in the oil fields to separate water from the oil and gas, and to break down oil-water emulsions and to separate the water therefrom. Separators are also used to a considerable extent in the chemical industry for the purpose of separating relatively high and low-density immiscible liquids. Emulsions are not encountered so frequently in the chemical industry, however, and the separators and the accessory equipment are usually simpler devices. In either case, however, some means must be provided for maintaining the desired level within the separating apparatus for the interface between the relatively high and low-density liquids.

This invention is concerned mainly with improvements on devices used to regulate and maintain the desired interfacial level, and in this specification, the preferred embodiment of my invention as applied to oil field emulsion separators will be described; but it is to be understood that my invention is not limited thereto. Further, in the following description "water" and "oil" may be any relatively high and low-density immiscible liquids, respectively.

In oil field practice the separator oil-water interfacial level is commonly held constant by means of a "siphon box," through which the separated water discharges from the separator. The term "siphon box" may include any "overflow" or "weir box" as descriptive of the apparatus. The siphon box encloses one or more water riser-pipes which are individually connected to the lower water zone of one or more compartments of the separator.

The pressure inside the siphon box is equalized with the separator by means of a vapor line connecting the siphon box and the separator vapor outlet. The level of the oil-water interface in each separator tank compartment is determined by the height of the overflow riser-pipe connected to the particular compartment, and by the relative specific gravities of the water and oil. For maximum separator efficiency the interfacial level must be held within narrow limits. Although the desired height of the siphon box overflow risers may be approximated when the equipment is manufactured in the factory, it will be apparent that the varying densities of oil and water encountered from place to place requires field adjustment of the installed equipment. The water riser height is commonly adjusted by removing a sealed coverplate of the siphon box and cutting off or joining on a length of pipe as required. This operation necessitates shutting down the well or wells served by the separator while such change is being made. Shutting-in an oil well may be highly undesirable for any of a number of reasons. For example, in some instances, a shut-in well will "sand up," which is undesirable, or it may be necessary to keep the well in operation in order to obtain the prorated production.

In accordance with my invention the adjustment of the height of a siphon box water riser may be made from an external point on the siphon box while the separator is in operation and without shutting-in the oil well or wells serviced by the separator.

It is an important object of this invention to provide a siphon box with one or more water overflow riser-pipes which are adjustable in height from a point outside the enclosed siphon box.

Another object of this invention is to provide a siphon box which governs the oil-water interfacial level within a separator and which is adjustable without shutting down the operation of the separator.

And still another object of this invention is to provide a simple and economical device for readily adjusting the height of an overflow riser-pipe located inside an enclosure by manipulation from a point outside the enclosure.

Other objects and advantages of the invention will be evident from the following detailed description, read in conjunction with the accompanying drawings, which illustrate my invention.

Figure 1:
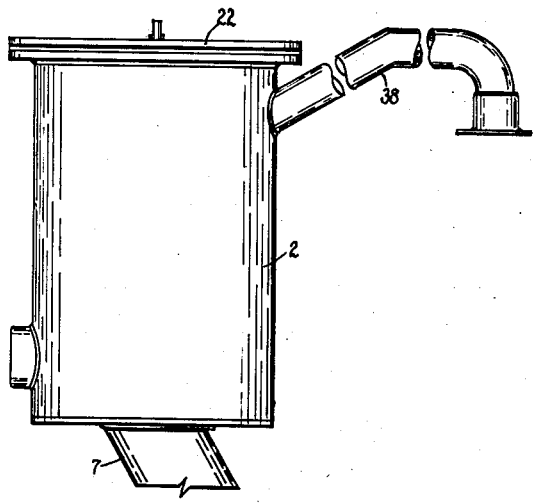
Fig. 1 is a side elevational view of a siphon box.
Figure 2:
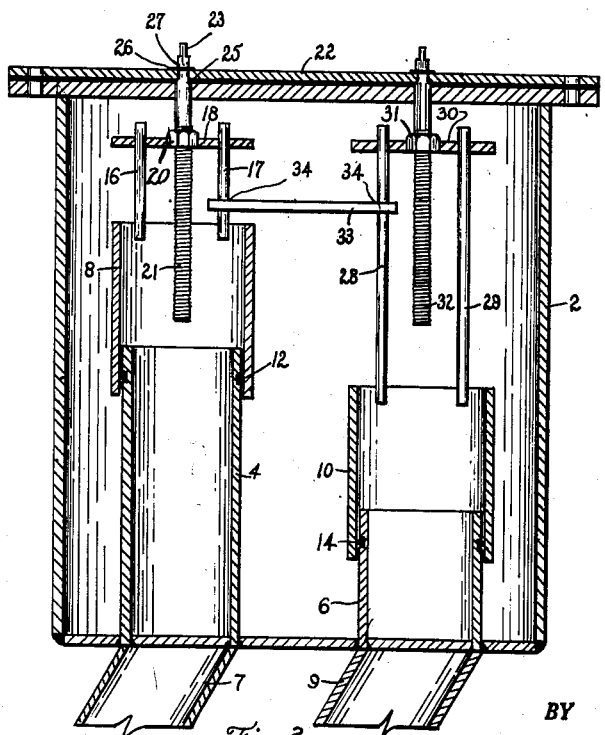
Fig. 2 is a sectional elevational view, slightly enlarged from Fig. 1, of the siphon box shown with two water risers which are adjustable in height in accordance with my invention.

Referring to Fig. 1, the usual siphon box housing 2 is pressure tight so as to permit operation at the same pressure as the separator (not shown). Inside the siphon box are two riser-pipes 4 and 6 which are in communication at the lower extremities with a conduit 7 leading to the free water knock-out chamber (not shown), and a second conduit 9 leading to the emulsion-treating chamber (not shown), respectively, of an oil field separator. Both risers 4 and 6 are provided with slip-over pipes or cylindrical members 8 and 10, respectively, and rubber seal O-rings 12 and 14 disposed between the surfaces of the pipes to effect a sealing, as will be be hereinafter set forth. The upper face of pipe 8 is provided with upstanding bars 16 and 17 welded at diametrically opposite points to the inner periphery of pipe 8. The bars extend vertically upward and are secured together by a cross-bar member 18. A nut 20 is suitably connected as by welding, to the center of cross-bar 18. A screw shaft 21 extends through nut 20 and also through the pressure cover-plate 22. The upper extremity of screw shaft 21 is provided with a suitable wrench pad 23 for turning. The screw shaft may be sealed relative to the pressure plate 22 by any suitable gasket such as O-ring (not shown). The screw shaft 21 is retained in the proper vertical position by means of shoulder 25, washer 26, and a cotter pin 27. The slip-over pipe 10 is provided with similar upstanding bars 28 and 29 of slightly greater length, a cross-bar 30, nut 31 and screw shaft 32 together with similar accessory parts. A crossbar 33 is slidably secured in any suitable manner to the bars 17 and 28 to prevent rotation of the slip-over pipes 8 and 10 during vertical adjustment thereof.

Operation

In operation, it may be desired to change the oil-water interfacial level in either the free water chamber or the emulsion-treating chamber of the separator (not shown). For adjustment in the free water chamber for example, a wrench is applied to wrench pad 23 and the screw shaft 21 is rotated in a right-hand direction to cause simultaneous upward movement of nut 20 and slip-over pipe 8 relative to riser-pipe 4. During such vertical movement bar 17 slides relative to bar 33 such as through an aperture 34 in bar 33. Conversely, a left-hand rotation of the screw shaft 21 causes nut 20 and slip-over pipe 8 to move downward relative to fixed riser-pipe 4, and results in a lowering of the oil-water interfacial level in the free water chamber of the separator. The slip-over pipe 10 is adjusted relative to riser pipe 6 in exactly the same manner as described above, through the nut 31 and screw shaft 32. The O-rings 12 and 14 permit the slip-over pipes 8 and 10 to slide freely while preventing any appreciable quantity of water from leaking through the annular spaces between the mating pipes. A pressure equalizing pipe 39 connects between the siphon box 2 and the separator (not shown).

From the foregoing it will be apparent that the present invention contemplates a siphon box for regulating the interfacial level in an emulsion treater, separating apparatus or the like without the necessity of going into the siphon box for making any adjustment. The interfacial level between a plurality of separate compartments in a separating apparatus may be individually adjusted from the exterior of the siphon box as desired. Although the present invention has disclosed only two overflow pipes corresponding to two chambers which would be capable of adjustment in the separator, it is to be understood that the invention is not limited thereto.

I claim:

1. In a siphon box for regulating the interfacial fluid level of an oil water emulsion treater or the like, comprising a housing, a plurality of cylindrical risers disposed in the housing and communicating with a plurality of fluid compartments in the treater, a movable slipover pipe provided on each of the risers for regulating the interfacial level between the fluids in the various compartments of the treater, means providing adjustment of the slipover pipes from the exterior of the siphon housing, said means comprising a rotatable shaft extending into the housing above each slipover pipe, a nut movable on each shaft in response to rotation of the shaft, and means connecting each nut with its respective slipover pipe to cause a simultaneous axial movement of the nut and slipover pipe upon rotation of the corresponding shaft, and means connected between the slipover pipes to prevent rotation of the slipover pipes during a movement thereof.

2. A siphon box as set forth in claim 1 with sealing means between the slipover pipes and the risers.

3. In a siphon box for regulating the interfacial fluid level of an oil water emulsion treater or the like, comprising a housing, a plurality of cylindrical risers disposed in the housing and communicating with a plurality of fluid compartments in the treater, a movable slipover pipe provided on each of the risers for regulating the interfacial level between the fluids in the various compartments of the treater, means providing adjustment of the slipover pipes from the exterior of the siphon housing, said means comprising a rotatable shaft extending into the housing above each slipover pipe, a nut movable on each shaft in response to rotation of the shaft, bars connecting the nuts with their respective slipover pipes to cause a simultaneous axial movement of each nut and its corresponding slipover pipe upon rotation of the corresponding shaft, and a bar slidably connected to the first mentioned bars to prevent rotation of the slipover pipes during movement thereof.

SAMUEL A. WILSON.

REFERENCES CITED

The following references are of record in the file of this patent:

UNITED STATES PATENTS

| Number | Name | Date |
|---|---|---|
| 664,565 | Livingood | Dec. 25, 1900 |
| 922,060 | Stockdon | May 18, 1909 |
| 1,396,889 | Sepulchre | Nov. 15, 1921 |
| 1,513,882 | Bateman | Nov. 4, 1924 |
| 1,618,151 | Fisher | Feb. 15, 1927 |